United States Patent [19]
Cox et al.

[11] Patent Number: 5,361,358
[45] Date of Patent: Nov. 1, 1994

[54] SYSTEM AND METHOD FOR INSTALLING PROGRAM CODE FOR OPERATION FROM MULTIPLE BOOTABLE OPERATING SYSTEMS

[75] Inventors: Clifford A. Cox, Austin; Steven G. Nacamuli, Round Rock; Laurie B. Turner; Amy L. Wilson, both of Austin, all of Tex.

[73] Assignee: International Business Machines Corporation, Armonk, N.Y.

[21] Appl. No.: 926,875

[22] Filed: Aug. 7, 1992

[51] Int. Cl.⁵ ............................................. G06F 9/445
[52] U.S. Cl. ............................. 395/700; 364/DIG. 1; 364/280; 364/280.2
[58] Field of Search ............... 364/DIG. 1, 280, 280.2

[56] References Cited

U.S. PATENT DOCUMENTS

| | | | |
|---|---|---|---|
| 4,335,426 | 6/1982 | Maxwell et al. | 364/200 |
| 4,799,145 | 1/1989 | Goss et al. | 364/200 |
| 4,825,358 | 4/1989 | Letwin | 364/200 |
| 5,068,780 | 11/1991 | Bruckert et al. | 395/700 |
| 5,136,711 | 8/1992 | Hugard et al. | 395/700 |

OTHER PUBLICATIONS

Research Disclosure, "IPL Record Extension For Alternate Boot Programs", Nov., 1989, No. 307, #307117.

*Primary Examiner*—Gareth D. Shaw
*Assistant Examiner*—A. Katbab
*Attorney, Agent, or Firm*—Mark S. Walker

[57] ABSTRACT

A method, system and process for installing an application under a first operating system and translating the installation parameters into a set of similar parameters to assure proper execution under a second operating system. The invention prompts a user for selection of preferences for an initial operating system and stores the initial selections representing a user's requirements under the initial operating system. Then, the hardware is examined to ascertain a list of all bootable devices and the operating systems associated therewith. The list of bootable devices is presented to the user for selection of which operating systems the application should be enabled under. Finally, the application is enabled in accordance with the information stored in the initial selections on each of the selected bootable devices and the operating systems associated with the bootable device.

8 Claims, 4 Drawing Sheets

5,361,358

SYSTEM AND METHOD FOR INSTALLING PROGRAM CODE FOR OPERATION FROM MULTIPLE BOOTABLE OPERATING SYSTEMS

FIELD OF THE INVENTION

This invention generally relates to improvements in installing applications under a plurality of operating systems.

BACKGROUND OF THE INVENTION

Application management has become the subject of significant recent interest, not only because of the popularity of low cost communication links for personal computers but also because of the ready made access via a LAN to many application programs. Today, computer systems often have a plurality of bootable operating systems. Until this invention, a user could not install an application under a first bootable operating system and automatically enable the other bootable operating systems that were on the computer or bootable devices associated with the computer to employ the application. Rather, individual installations were required for each of the other operating systems.

An example of an US Patent for executing programs in a multi-mode microprocessor is U.S. Pat. No. 4,825,358 to Microsoft. This patent discloses a method and system for executing programs in two modes on a specific hardware platform. However, a single operating system is always operable and only one bootable device is discussed.

Remote processor initialization is also well known in the prior art. Remote processor initialization refers to the capability of downloading an Initial Program Load (IPL) sequence to a computer via a communication link. This process allows a remote computer to boot another computer in a predetermined manner. However, a single operating system is always operable and only one bootable device is discussed.

SUMMARY OF THE INVENTION

Accordingly, it is a primary object of the present invention to provide a technique for installing an application under a first operating system and then automatically enabling the same application under multiple other operating systems.

These and other objects of the present invention are accomplished by the operation of a process in the memory of a processor. The processor, under the control of the process, installs an application under a first operating system and translates the installation parameters into a set of similar parameters to assure proper execution under a second operating system. The invention prompts a user for selection of preferences for an initial operating system and stores the initial selections representing a user's requirements under the initial operating system. Then, the hardware is examined to ascertain a list of all bootable devices and the operating systems associated therewith. The list of bootable devices is presented to the user for selection of which operating systems the application should be enabled under. Finally, the application is enabled in accordance with the information stored in the initial selections on each of the selected bootable devices and the operating systems associated with the bootable devices.

DETAILED DESCRIPTION OF THE INVENTION

PREFERRED EMBODIMENT

Figure 1:
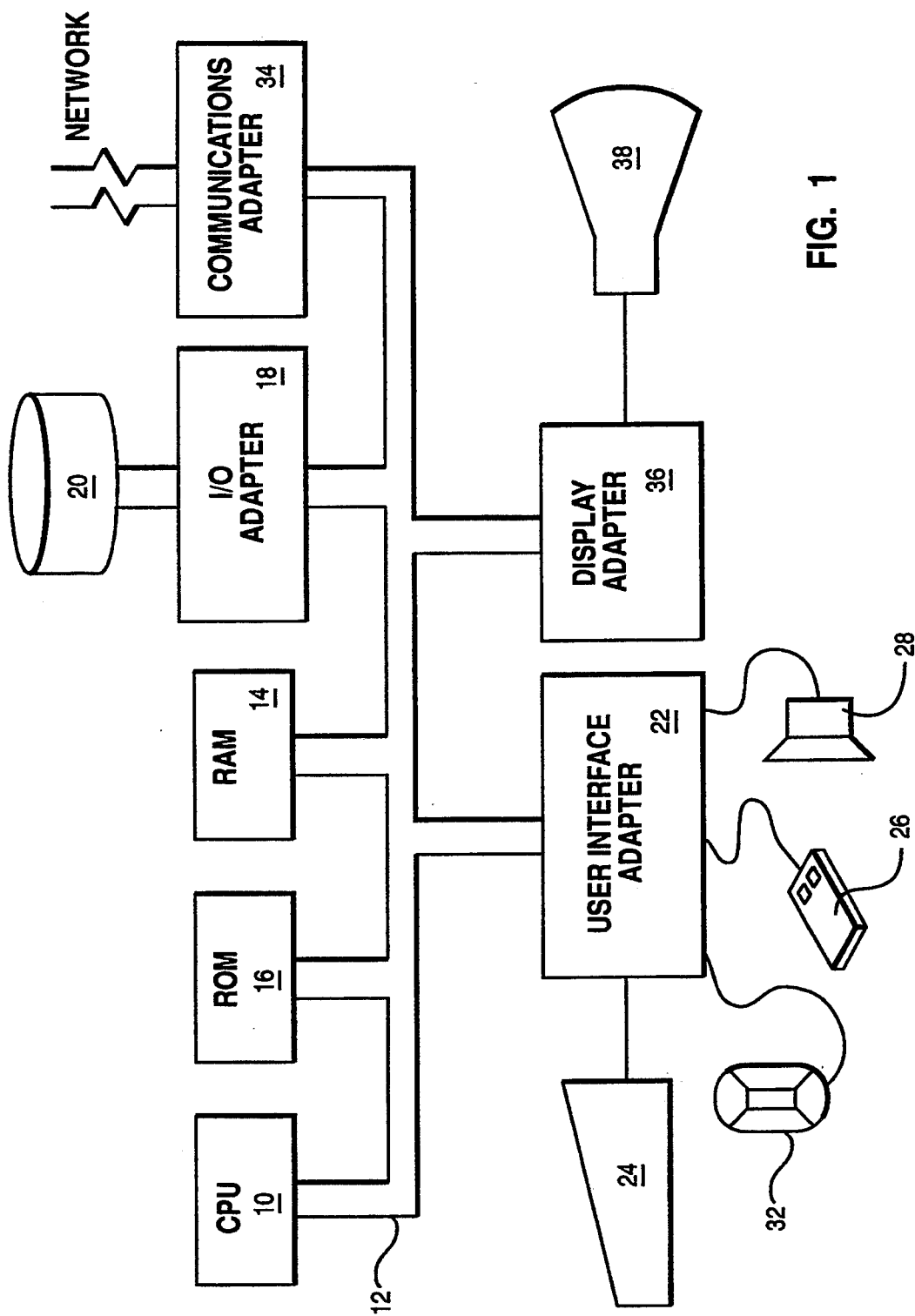
FIG. 1 is a block diagram of a host computer in accordance with the subject invention.

A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38.

The preferred embodiment of the subject invention is an IBM Personal System/2 with the IBM OS/2 operating system installed. Detailed descriptions of the hardware and software environment are provided in *PS/2 Hardware Interface Technical Reference*, S10G-6457, IBM Corporation (1991), and *OS/2 Presentation Manager Programming*, SC28-2700, IBM Corporation (1992). While the invention will be described in terms of this hardware and software, one skilled in the art will recognize that other operating systems and hardware can be supported without undue experimentation.

Figure 2:
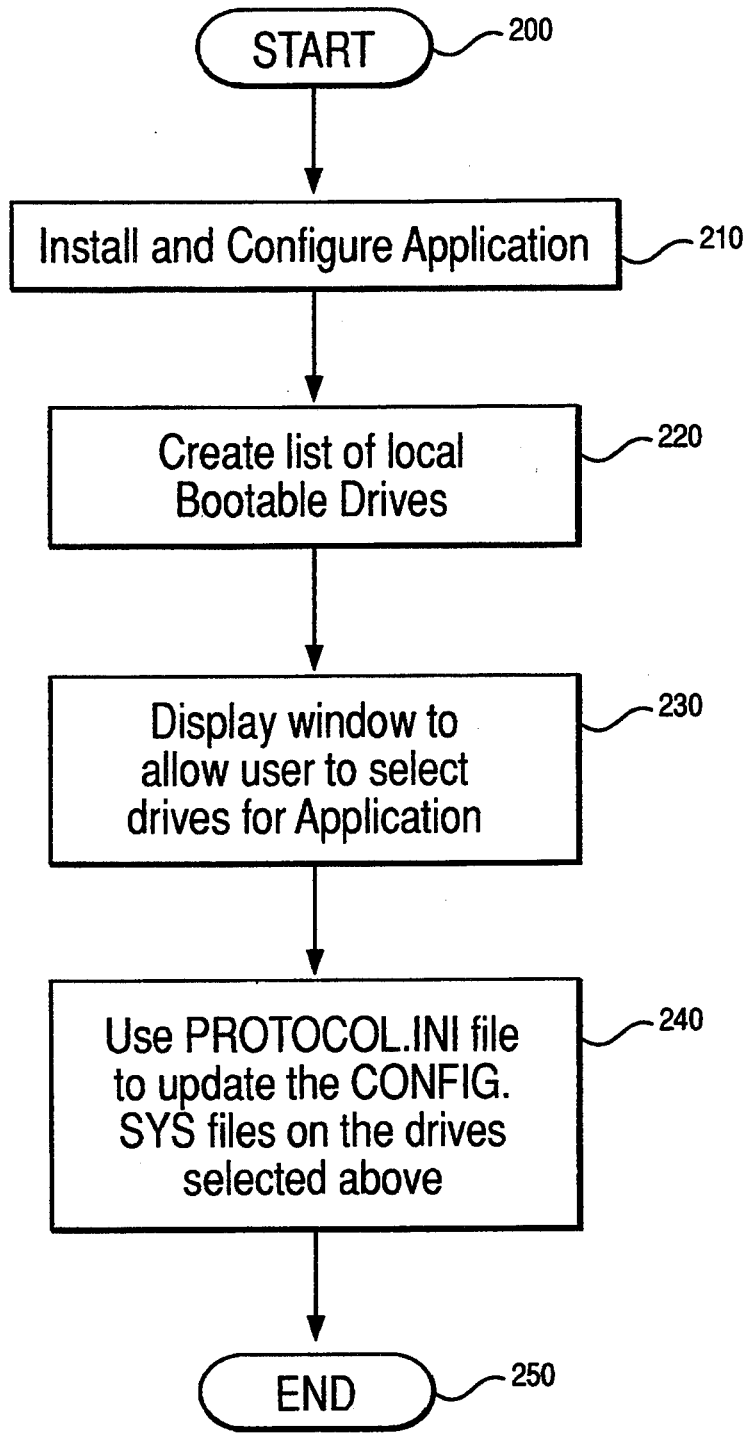
FIG. 2 is a flowchart in accordance with the subject invention.

A flowchart of the subject invention is presented in FIG. 2. Processing commences at terminal 200 and immediately flows to function block 210 for the installation and configuration of an application under a first operating system. Thereafter, a list of local OS/2 bootable devices is created in function block 220. A bootable device is any device having a file thereon that can be used to Initial Program Load (IPL) the computer system. Thus, any hard disk or diskette drive can be a bootable device. Also, a communication link attaching the computer system to a remote system can be a bootable device. Then, in function block 230, a window is displayed to allow a user to select drives and the corresponding bootable operating system thereon for enablement of the application. Finally, in function block 240, the installation file created in function block 210 is used to update the system files of the operating systems selected in function block 230 and processing is terminated in terminal 250. The details of the functions will be discussed below with reference to the figures.

INSTALLING AND CONFIGURING AN APPLICATION

Figure 3:
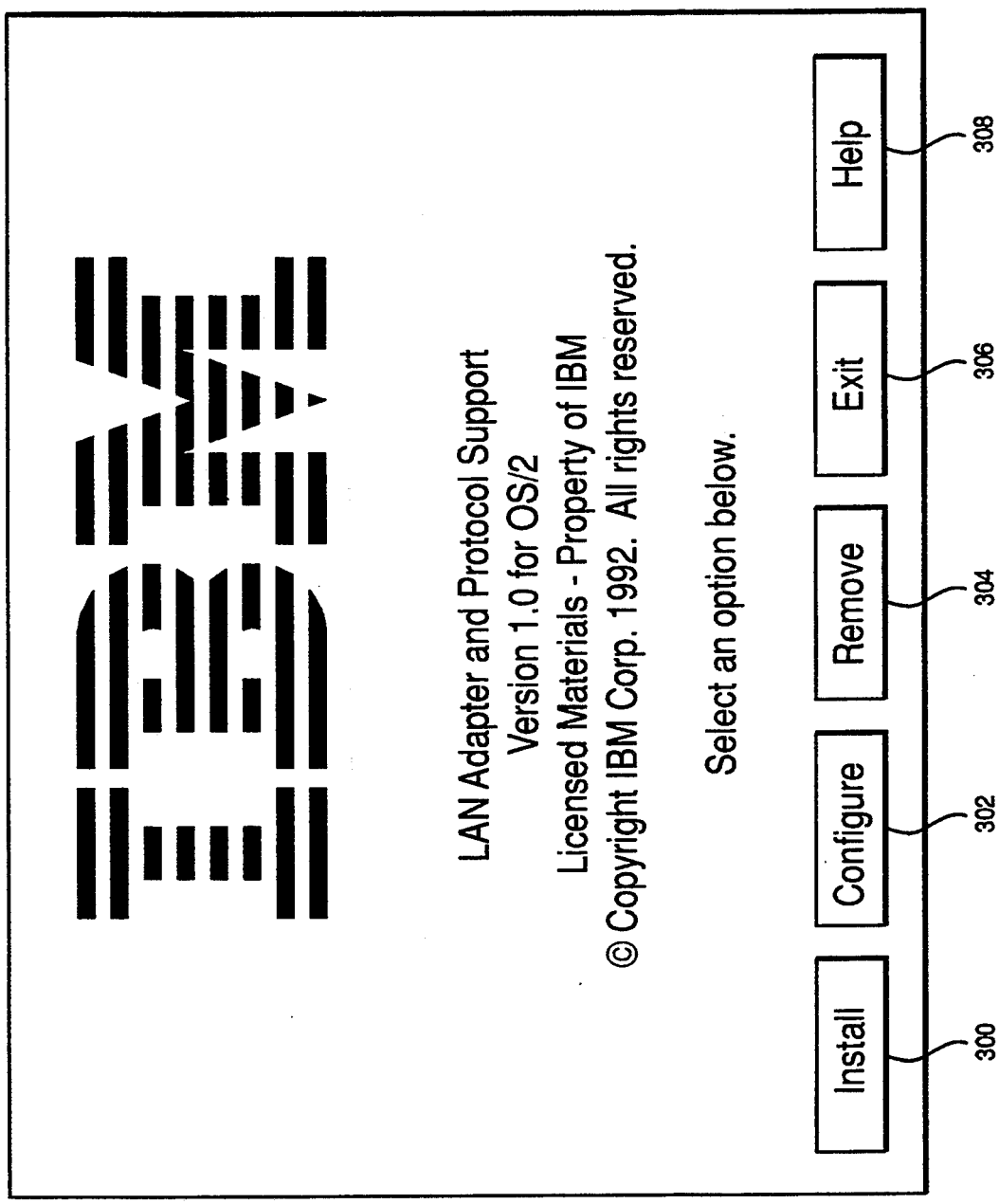
FIG. 3 illustrates a display of an application installation in accordance with the subject invention.

FIG. 3 is an illustration of an application installation display in accordance with the subject invention. The Install pushbutton 300 is the default pushbutton if no application has currently been installed on the system. This button is selected when a user desires to install an application. The Configure pushbutton 302 is the default if an application is already installed on a first operating system. Selection of this button initiates the configure operation. The Remove pushbutton 304 is selected when a user desires to remove an application from the system. The Exit pushbutton 306 is selected to exit the program. If a configuration has already been commenced, then the user will be prompted with the next configuration step to avoid discontinuity. Finally, the Help pushbutton 308 produces a help dialog that provides specific information for each of the other buttons.

To install an application, the following steps are executed.

1) Insert the application diskette into drive "A:". From "A:" type "LAPS" to begin the installation/configuration program.
2) Select the INSTALL pushbutton 300 on the main window and enter the letter of the drive on which you want the application installed on "Target Drive" window.
3) After installation is complete and you are returned to the main LAPS window, select the CONFIGURE pushbutton 302, then select the "Configure LAPS" pushbutton and create the desired configuration on the "Configure Workstation" window.
4) You will be returned to the LAPS main window where you should press the EXIT pushbutton 306 to exit LAPS. At this point the machine is searched for local bootable drives and the user is presented the "Update CONFIG.SYS" window.

DISPLAY

Figure 4:
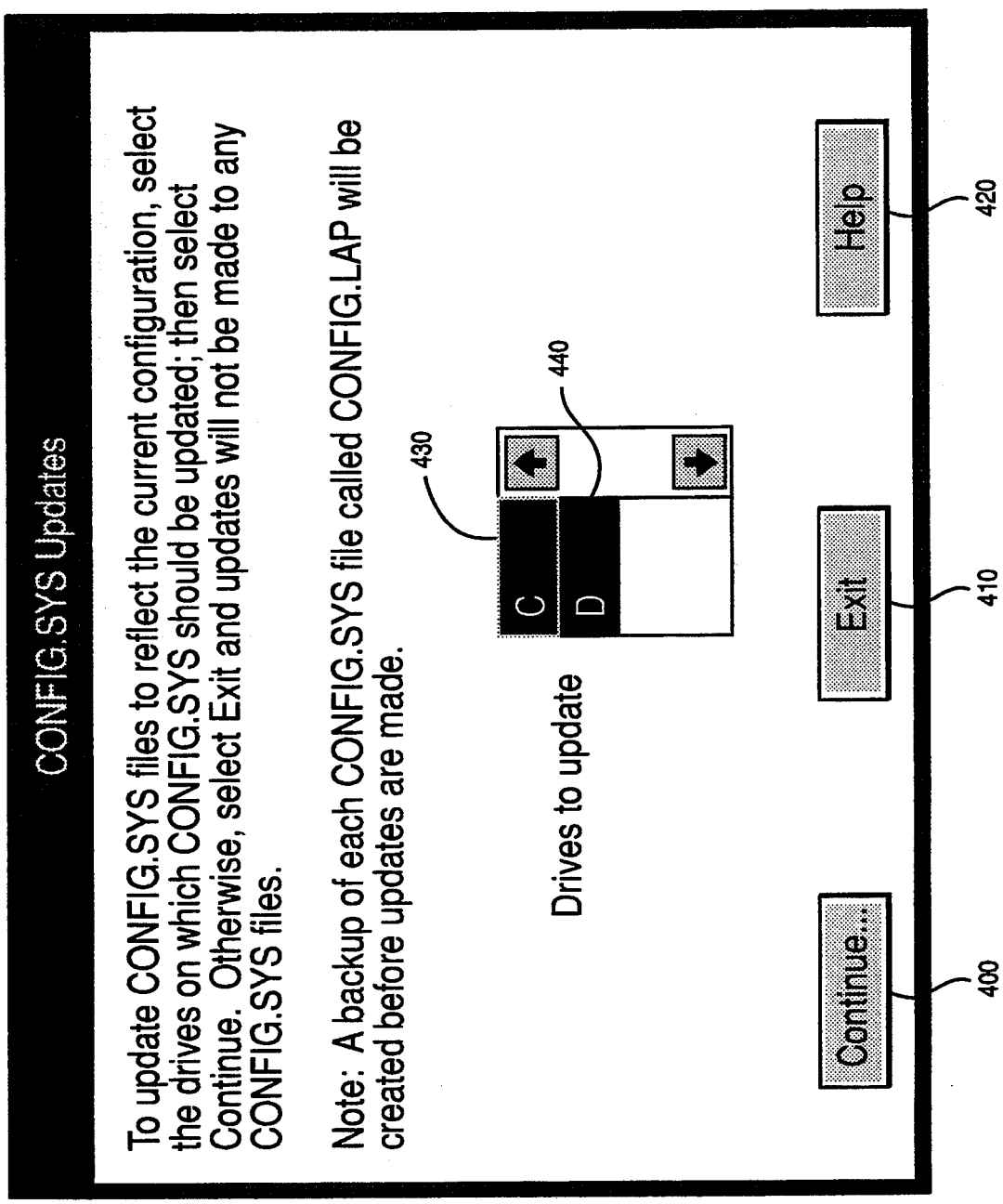
FIG. 4 is a display of an application update in accordance with the subject invention.

This file contains the source for the window which allows the user to select the bootable devices on which the CONFIG.SYS files will be updated with the PROTOCOL.INI information. FIG. 4 illustrates the display the user interacts with to select the bootable devices to enable.

The following C-source code is a dialog which processes a multi-select list box of bootable devices.

```
/**********************************************************/
/*
** FUNCTION NAME: LAPSCFGSYSMsgProc
**
** FUNCTION:    This routine sets up and displays the
**              IDLG_LAPSCFGSYS dialog
**
** CALLED FROM: Module: XIATND.C
** EXIT NORMAL: 0.
** Function is exception handled (see EXCEPT.C).
*/
/**********************************************************/
MRESULT EXPENTRY LAPSCFGSYSMsgProc(hWndDlg,
message, mp1, mp2)
HWND hWndDlg;
USHORT message;
MPARAM mp1;
MPARAM mp2;
{
    MRESULT fpRC = (MRESULT) FALSE;
    SHORT mymp1;
    USHORT i;
    CHAR insertstring[2];
    SHORT SelectedItem;
    BOOL anyselected;
    CHAR Temp[] = "a:";
WITH_HANDLING
    switch(message)
    {
    case WM_INITDLG:
        for (i=0;i<BootableDriveCount;i++) {
            insertstring[0] = Bootable_Drive_List[i];
            insertstring[1] = NULLCHAR;
            WinSendDlgItemMsg(hWndDlg,
                CFGSYS_LB_DRIVES, LM_INSERTITEM,
                MPFROM2SHORT (LIT_SORTASCENDING, 0),
                MPFROMP(insertstring));
        } /* endfor */
        anyselected = FALSE;
        for (i=0;i<BootableDriveCount;i++) {
        Temp[0] = Bootable_Drive_List[i];
            if (Check_Configsys_For_Ibmcomdrive(Temp)) {
                WinSendDlgItemMsg(hWndDlg,
                CFGSYS_LB_DRIVES, LM_SELECTITEM,
                MPFROMSHORT(i), MPFROMSHORT(TRUE));
                anyselected = TRUE;
            }
        } /* endfor */
        if (!anyselected) {
            WinSendDlgItemMsg(hWndDlg,
                CFGSYS_LB_DRIVES, LM_SELECTITEM,
                MPFROMSHORT(0), MPFROMSHORT(TRUE));
        } /* endif */
        WinSendDlgItemMsg( hWndDlg,
            CFGSYS_LB_DRIVES, LM_SELECTITEM,
            MPFROMSHORT(0), MPFROMSHORT(TRUE));
        WinSetFocus(HWND_DESKTOP,
            WinWindowFromID(hWndDlg,
            CFGSYS_LB_DRIVES));
        fpRC = (MRESULT)TRUE;
        CenterDlgBox(hWndDlg, hWndClient);
        break; // End of WM_INITDLG
    case WM_CONTROL:
        break; // End of WM_CONTROL
    case WM_COMMAND:
        switch(SHORT1FROMMP(mp1))
        {
        case CFGSYS_PB_CONTINUE:   //Continue
            i = 0;
            SelectedItem = LIT_FIRST;
// loop through selected list and retrieve values
selected
            do {
                SelectedItem = (SHORT) WinSendDlgItemMsg
                    (hWndDlg, CFGSYS_LB_DRIVES,
                    LM_QUERYSELECTION,
                    MPFROMSHORT( SelectedItem), 0L);
                if (SelectedItem != LIT_NONE) {
                    WinSendDlgItemMsg(hWndDlg,
                    CFGSYS_LB_DRIVES,
                    LM_QUERYITEMTEXT,
                    MPFROM2SHORT(SelectedItem, sizeof
                            insertstring),
                            MPFROMP(insertstring));
                    SelectedDxives[i] = insertstring[0];
                    i++;
                } else { //at end of list
                    SelectedDrives[i] NULLCHAR;
                } /* endif */
            } while (SelectedItem != LIT_NONE);
            if (i==0) {
                DisplayMessageBox( hWndDlg,
            DLGS_CFGSYS_MUSTSELECT_TITLE,
            DLGS_CFGSYS_MUSTSELECT_MSG,
            ACTION_MSG, OK_BUTTON,
            (USHORT)CFGSELE_EXTHELP25720,
            (PSZ)NULL); //
            } else {
                WinDismissDlg(hWndDlg, FALSE);
            } /* endif */
            break;
        case CFGSYS_PB_EXIT:    // Exit
            WinDismissDlg(hWndDlg, FALSE);
            SelectedDrives[0] = NULLCHAR;
            break;
        }
    break; // End of WM_COMMAND
    case WM_CLOSE:
    WinDismissDlg(hWndDlg, FALSE);
    break; // End of WM_CLOSE
```

```
        default:
            fpRC = WinDefDlgProc(hWndDlg, message, mp1,
                    mp2);
        break;
    }
ON_EXCEPTION
    ReportError(theException, PM | LOG, hWndDlg, 0);
    WinDismissDlg(hWndDlg, FALSE);
    mymp1 = (SHORT)theException;
    WinPostMsg(hWnd, LAPSWM_EXCEPT,
MPFROMSHORT(mymp1), 0L);
END_HANDLING;
/*
** Return value
*/
    return fpRC;
} /* End of LAPSCFGSYSMsgProc */
```

UPDATE

An intermediate file, PROTOCOL.INI, is created during the install process. This file is used as input for updating the other operating system environments for execution of the application.

The following is an example of a PROTOCOL.INI file created by a user using LAPS to do configuration:

```
[PROT_MAN]
    DRIVERNAME = PROTMAN$
[IBMLXCFG]
    IBMTOK_nif = IBMTOK.nif
    LANDD_nif = LANDD.nif
[LANDD_nif]
    DriverName = LANDD$
    Bindings = IBMTOK_nif
    ETHERAND_TYPE = "I"
    SYSTEM_KEY = 0x0
    OPEN_OPTIONS = 0x2000
    TRACE = 0x0
    LINKS = 8
    MAX_SAPS = 3
    MAX_G_SAPS = 0
    USERS = 3
    TI_TICK_G1 = 255
    T1_TICK_G1 = 15
    T2_TICK_G1 = 3
    TI_TICK_G2 = 255
    T1_TICK_G2 = 25
    T2_TICK_G2 = 10
    IPACKETS = 250
    UIPACKETS = 100
    MAXTRANSMITS = 6
    MINTRANSMITS = 2
    TCBS = 64
    GDTS = 30
    ELEMENTS = 800
[IBMTOK_nif]
    DriverName = IBMTOK$
    ADAPTER = "PRIMARY"
    MAXTRANSMITS = 6
    RECVBUFS = 2
    RECVBUFSIZE = 256
    XMITBUFS = 1
```

To see how the CONFIG.SYS file is updated based on the PROTOCOL.INI file, look at the following sections from the PROTOCOL.INI file. LAPS locates the *.NIF file containing information pertinent to the driver that is being configured.

```
[IBMLXCFG]
    IBMTOK_nif = IBMTOK.nif
```

```
[IBMTOK_nif]
    DriverName = IBMTOK$
```

Note that the file name is retrieved from a common section (IBMLXCFG) for the particular driver of interest. Then, the *.NIF file is read to extract the information necessary to build the appropriate 'DEVICE=' statements in the CONFIG.SYS file:

```
[IBMTOK]
Type = NDIS
Title = "IBM Token-Ring Network Adapters"
Version = 1.0
DriverName = IBMTOK$
Xports = NETBEUI LANDD
Copyfile = LT2.MSG, LT2H.MSG
[FILE]
Name = IBMTOK.OS2
Path = IBMCOM   MACS
```

In this example, the following statement would be built in the CONFIG.SYS file:

DEVICE = C:\ IBMCOM\MACS\IBMTOK.OS2

This same scenario is repeated for each drive selected on the window display illustrated in FIG. 4.

ENABLING OTHER BOOTABLE SYSTEMS

In order to discern which bootable devices are available on a given computer system, the following logic is performed. First, to locate bootable devices, a loop is executed for possible drives A to Z to determine if the particular device is a fixed disk drive. If the drive is a fixed drive, then if it is a local drive, it is added to a temporary list of local drives and a test is performed to determine if the physical drive has been configured by examination of the SYSLEVEL.OS2 file and CONFIG.SYS file of OS/2. If the physical drive has been configured, then it is added to the list of drives.

To determine if the drive is bootable, the device must first be opened employing a DOSOPEN call. If the device is a local device, then the device parameters must be retrieved from the Control file, DOSDEVIOCTL. If the device is a tape drive, then it is noted. Otherwise, a test is performed to determine if the device is fixed or removable by further examination of DOSDEVIOCTL. If the device is a fixed drive device then the fact is noted. However, if the device is removable, then the floppy drive device is returned. Otherwise, an unknown media type is returned. If the device is a non-local device, that fact is also noted, and finally, the device is closed. A final check is performed to verify that the proper system files reside on the bootable device. The source code corresponding to this processing appears below.

SOURCE CODE FOR CREATING LIST

```
/*************************************************/
/*
** FUNCTION NAME: Find_Local_Bootable_Drives
**
** FUNCTION: which drives are local
```

```
**      and bootable.
** CALLED FROM: Module: XIATND.C
**
** INPUT:
**
** OUTPUT:
**
** EXIT NORMAL: 0. Exception handled.
*/
/****************************************************/
VOID Find_Local_Bootable_Drives(PSZ BootDrives)
{
    USHORT count;
    USHORT i;
    CHAR dname;              /* ASCII drive name */
    CHAR templist[26];
    CHAR syslevelfile[MAXPATHLEN]= "a:";
    CHAR configfile[MAXPATHLEN]="a:";
    DosError(DISABLE_ERRORPOPUPS);
    /* Disable error */
    count = 0;
    for (i=0;i<26;i++) {     Do drives A thru Z */
        dname = (CHAR)'A' + (CHAR)i;  /* Setup drive */
        if (check_media_type(&dname) == FIXED_DRIVE) { //if
                                          it's local
            templist[count] = dname;  //add it to our array
            count++;
        }
    } //end for
    //Now determine which of these are bootable
    BootableDriveCount = 0;
    strcat(syslevelfile,SYSLEVEL);
    strcat(configfile,CONFIG_SYS);
    for (i=0;i<count;++ ) {
        syslevelfile[0] = templist[i];
        if (Exist(syslevelfile)) {
            configfile[0] = templist[i];
            if (Exist(configfile)) {
                BootDrives[BootableDriveCount] = templist[i];
                BootableDriveCount++;
            } /* endif */
        } /* endif *
    } /* endfor */
    DosError(ENABLE_ERRORPOPUPS); /* Disable error
                                          popups */
}
```

SOURCE CODE THAT DETERMINES THE
MEDIA TYPE FOR EACH DEVICE SCANNED IN
FIND_LOCAL_BOOTABLE_DRIVES

```
/****************************************************/
/*
** FUNCTION NAME: check_media_type
**
** FUNCTION:
**    This routine will check the type of the media - and
**       determine if it
**    is a tape drive, floppy, remote drive, or fixed or
**       CD-ROM.
**
**    The routine expects as input the drive letter for
**       the media.
**
** CALLED FROM: Module: check_disk_space
**
** INPUT
**
** OUTPUT:
**
** EXIT NORMAL: ... Function is exception handled.
*/
/****************************************************/
USHORT check_media_type(driveletter)
    CHAR * driveletter;
{
    USHORT rc;
    CHAR DriveString[3];
    Type_Drive DevInfo;
    USHORT DevHandle;
    USHORT action;
    ULONG size = 0;
    BYTE ParmList = 0x00;
    BYTE Fixed;
    //Determine if drive is floppy or non-local
    DriveString[0] = *driveletter;
    DriveString[1] = COLONCHAR;
    DriveString[2] = NULLCHAR;
    //Open the device
    if (!(DosOpen(DriveString, &DevHandle, &action, size,
        NORM, READ_ONLY, OPENMODE, 0L))){
        // Get device parameters
        if (!(DosDevIOCtl(&DevInfo, &ParmList, 0x0063,
            0x008, DevHandle))) {
            if (DevInfo.DevType == 6) { //it's a tape drive
                rc = TAPE_DRIVE;
            } else {
                //Determine if media is removable
                if (!(DosDevIOCtl(&Fixed, &ParmList, 0x0020,
                    0x0008,
        DevHandle))) {
                    if (Fixed) {
                        rc = FIXED_DRIVE; //it's not
                                          removable
                    } else {
                        rc = FLOPPY_DRIVE; //it's a
                                          removable floppy
                    } /* endif */
                } else {
                    rc = UNKNOWN_MEDIA;
                } /* endif */
            } endif */
        } else {
            rc = UNKNOWN_MEDIA;
        } /* endif */
        DosClose(DevHandle);
    } else {
        rc = REMOTE_DRIVE;
    } /* endif */
    return(rc);
}
/****************************************************/
/*
** FUNCTION NAME: Exist
**
** FUNCTION: checks to see if IBMLVL.INI exists
**
** CALLED FROM: Function: Check_IBMLVL (this module)
**
** INPUT:
**
** OUTPUT: returns TRUE if file exists or FALSE if it
**    doesn't
**
** EXIT NORMAL: 0.
*/
/****************************************************/
BOOL Exist (PSZ pszFileName)
{
    HDIR           = HDIR _CREATE;
    USHORT         usSearchCount = 1;
    FILEFINDBUF    findbuf;
    if (DosFindFirst(pszFileName,
        &hdir,
        FILE_DIRECTORY,
        &findbuf,
        sizeof(findbuf),
        &usSearchCount,
        0L))
        return FALSE ;
    else
        return TRUE ;
} /* Exist ( ) */
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A system for installing program code on a computer system for operation with multiple alternately bootable operating systems each residing on an alternately bootable storage means, said system comprising:
    means for installing said program code for operating with a first operating system, said program code including program configuration information for operating said program code;
    means for identifying all alternately bootable storage means attached to said computer system, said alternately bootable storage means each having system control data; and
    means for modifying said system control data on each of said alternately bootable storage means to include said program configuration information for operating said program code.

2. The system of claim 1 further comprising:
    operator interface means for receiving operator input;
    bootable storage selection means for presenting to an operator a list of all bootable storage means identified by said means for identifying and for receiving operator selections from said operator interface means; and
    wherein said means for modifying modifies the system control data only on those bootable storage systems selected by said bootable storage selection means.

3. The system of claim 1 wherein said means for identifying all bootable storage means comprises:
    means for identifying all storage media connected to said computer system; and
    means for testing each of said identified storage media for the presence of a boot control file; and
    means for indicating a bootable storage means when said means for testing finds said boot control file.

4. The system of claim 1 wherein said means for installing comprises:
    means for writing program code to a storage medium attached to said computer system and accessible to one or more of said alternately bootable operating systems; and
    means for writing configuration information for said program code to said storage medium.

5. A method for installing computer program code on a computer system having a processor and one or more persistent storage means, said one or more persistent storage means having two or more bootable operating systems for operating said computer system, the method comprising the steps of:
    copying said computer program code to a first persistent storage means;
    building a list of all storage means having a bootable operating system, each of said bootable operating systems having system control data; and
    modifying said system control data for each of said bootable operating systems to incorporate configuration data for said program code.

6. The method of claim 5, further comprising the steps of:
    presenting a computer system operator with a choice of storage means for loading said program code; and
    accepting operator input indicating storage means selection;
    and wherein said first storage means is said selected storage means.

7. The method of claim 6, further comprising the steps of:
    presenting a list of said bootable operating systems to said computer system operator; and
    accepting operator input indicating which of said bootable operating systems should have its system control data modified;
    and wherein said step of modifying said control data modifies only the system control data of selected bootable operating systems.

8. The method of claim 5, wherein said step of building a list comprises the steps of:
    constructing a list of possible storage means connections;
    testing each of said possible storage means connections for presence of a storage means to create a list of present storage means;
    testing each of said present storage means to detect the presence of system control data; and
    creating a list of bootable storage means for each of said present storage means on which system control data is present.

* * * * *